United States Patent
Goto et al.

(10) Patent No.: US 10,835,950 B2
(45) Date of Patent: Nov. 17, 2020

(54) CASTING MOLD, AND PRODUCTION METHOD THEREOF

(71) Applicant: HONDA MOTOR CO., LTD., Tokyo (JP)

(72) Inventors: Minoru Goto, Tochigi (JP); Kenji Yuki, Tochigi (JP); Satoshi Sakamoto, Tochigi (JP); Takashi Fujita, Tochigi (JP)

(73) Assignee: HONDA MOTOR CO., LTD., Tokyo (JP)

(*) Notice: Subject to any disclaimer, the term of this patent is extended or adjusted under 35 U.S.C. 154(b) by 375 days.

(21) Appl. No.: 15/878,963

(22) Filed: Jan. 24, 2018

(65) Prior Publication Data

US 2018/0207714 A1    Jul. 26, 2018

(30) Foreign Application Priority Data

Jan. 25, 2017 (JP) .................. 2017-011169

(51) Int. Cl.

| | |
|---|---|
| B22C 3/00 | (2006.01) |
| B22D 18/04 | (2006.01) |
| B23K 26/364 | (2014.01) |
| B22C 9/06 | (2006.01) |
| B22D 21/00 | (2006.01) |
| B22D 17/22 | (2006.01) |
| B22D 21/04 | (2006.01) |

(52) U.S. Cl.
CPC .................. *B22C 3/00* (2013.01); *B22C 9/06* (2013.01); *B22D 17/22* (2013.01); *B22D 18/04* (2013.01); *B22D 21/007* (2013.01); *B22D 21/04* (2013.01); *B23K 26/364* (2015.10)

(58) Field of Classification Search
CPC .. B22C 3/00; B22C 9/06; B22D 17/22; B22D 18/04; B22D 21/007; B22D 21/04
See application file for complete search history.

(56) References Cited

U.S. PATENT DOCUMENTS

| 9,156,080 B2 | 10/2015 | Yuki et al. |
| 2015/0027655 A1 | 1/2015 | Yuki et al. |

FOREIGN PATENT DOCUMENTS

| JP | 5718415 | 3/2015 |
| JP | 5814988 | 10/2015 |

*Primary Examiner* — Kevin P Kerns
*Assistant Examiner* — Steven S Ha
(74) *Attorney, Agent, or Firm* — Rankin, Hill & Clark LLP

(57) ABSTRACT

A casting mold and a production method thereof with which exfoliation of coating is controlled and liquidity of molten metal can be maintained are provided. This casting mold 1 includes a surface processing part 3 in which a plurality of groove parts 5 of a grid groove 4 formed in a surface of a molten metal contact part of a mold material 2 is coated with a carbon film 6. In this surface processing part 3, a width W1 of the groove parts 5 is 35 μm or narrower, skewness Ssk of three-dimensional surface roughness is in a range of −0.8 to −0.2, and indentation hardness of the carbon film 6 tested by a nanoindenter is 1000 N/mm² or higher. With this arrangement, it is possible to optimize the surface processing part 3 in such a manner that a penetration rate of the molten metal (aluminum 10) is controlled to be low and the coating (carbon film 6) is unlikely to exfoliate from the groove parts 5.

6 Claims, 4 Drawing Sheets

CASTING MOLD, AND PRODUCTION METHOD THEREOF

This application is based on and claims the benefit of priority from Japanese Patent Application No. 2017-011169, filed on 25 Jan. 2017, the content of which is incorporated herein by reference.

BACKGROUND OF THE INVENTION

Field of the Invention

The present invention relates to a casting mold, and a production method thereof.

Related Art

Generally, in a case where metal is cast into a desired shape, it is important, for example, in a die-cast mold that liquidity in the plan part (part from the plunger part, from which molten metal is supplied, to the cavity) and in the cavity thereof is improved in such a manner that molten metal (such as aluminum) poured into the mold quickly and smoothly fills the whole area in the cavity with a predetermined molten metal temperature being maintained.

Thus, an applicant has proposed a technology for improving the liquidity of molten metal by reducing the contact area between the molten metal and the mold surface by forming a plurality of microscopic groove parts in a grid shape in the mold surface by ablation processing with a pulsed laser and forming an air gap (see, for example, Patent Document 1). Moreover, the applicant has also proposed a technology of further improving the liquidity of molten metal by improving the heat insulation property of the mold surface, in addition to groove processing with a laser, by coating the inside of the groove parts with a carbon film in order to prevent the mold surface from cooling and the liquidity from decreasing when the molten metal and the mold come into contact with each other (see, for example, Patent Document 2).

Patent Document 1: Japanese Patent No. 5814988
Patent Document 2: Japanese Patent No. 5718415

SUMMARY OF THE INVENTION

However, in a case where molten metal is poured onto a mold surface in which a microscopic groove part is formed, penetration of the molten metal (a phenomenon when molten metal penetrates into the groove part) is generated depending on the shape of the groove part. When the penetration rate of this molten metal (rate of molten metal in the volume of the groove part) becomes high, the contact area between the molten metal and the coating (carbon film) is increased and frictional force is increased, and there is a possibility that the coating (carbon film), which is a heat insulation layer, exfoliates from the groove part. When the coating exfoliates, the heat insulation property between the mold and the molten metal is decreased, and the liquidity of the molten metal cannot be improved.

The present invention is provided in view of such a situation and is to provide a casting mold and a production method thereof with which it is possible to control exfoliation of the coating and to maintain the liquidity of the molten metal.

A casting mold according to an embodiment of the present invention (such as casting mold 1 described later) is a casting mold including a surface processing part (such as surface processing part 3 described later) in which a groove part (such as groove part 5 described later) of a grid groove (such as grid groove 4 described later) formed in a surface of a molten metal contact part of a mold material (such as mold material 2 described later) is coated with a carbon film (such as carbon film 6 described later). In the surface processing part, a width of the groove part (such as width W1 described later) is 35 μm or narrower, skewness of three-dimensional surface roughness (such as skewness Ssk described later) is in a range of −0.8 to −0.2, and indentation hardness of the carbon film tested by a nanoindenter (such as indentation hardness H1 described later) is 1000 N/mm² or higher.

The surface processing part may be formed in the molten metal contact part of the mold material including a plan part.

A method of producing a casting mold according to an embodiment of the present invention is a method of production of the above casting mold. The method includes forming the groove part by emitting a pulsed laser beam onto a surface of the mold material with a pulsed laser device that emits the pulsed laser beam with a pulse width of 10 psec or narrower.

The groove part may be formed by first laser processing in such a manner that a width thereof becomes 35 μm or narrower, a microscopic groove (such as microscopic groove 9 described later) may be formed, by second laser processing, in a top surface of a projection part (such as projection part 7 described later) provided when forming the groove part, and the carbon film may be formed in such a manner as to cover the groove part and the microscopic groove.

According to an embodiment of the present invention, it is possible to optimize the surface processing part of a casting mold in such a manner that the coating is less likely to exfoliate from the groove part by specifying the numeric value of the surface texture thereof with three evaluation indexes and controlling the penetration rate of molten metal to a low level. As a result, it becomes possible to control exfoliation of the coating and to maintain the liquidity of the molten metal in the casting mold.

DETAILED DESCRIPTION OF THE INVENTION

Figure 1:
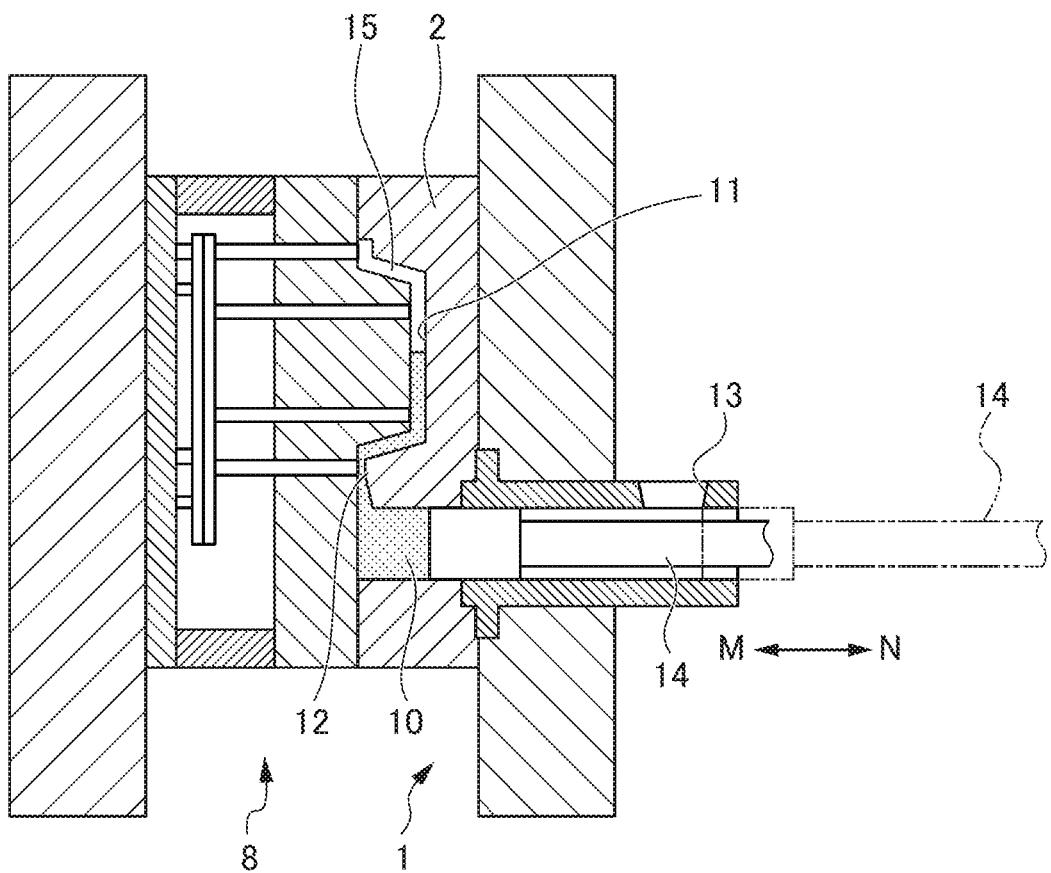
FIG. 1 is a sectional view illustrating an injection process in an aluminum casting process using a casting mold according to an embodiment of the present invention.
Figure 2:
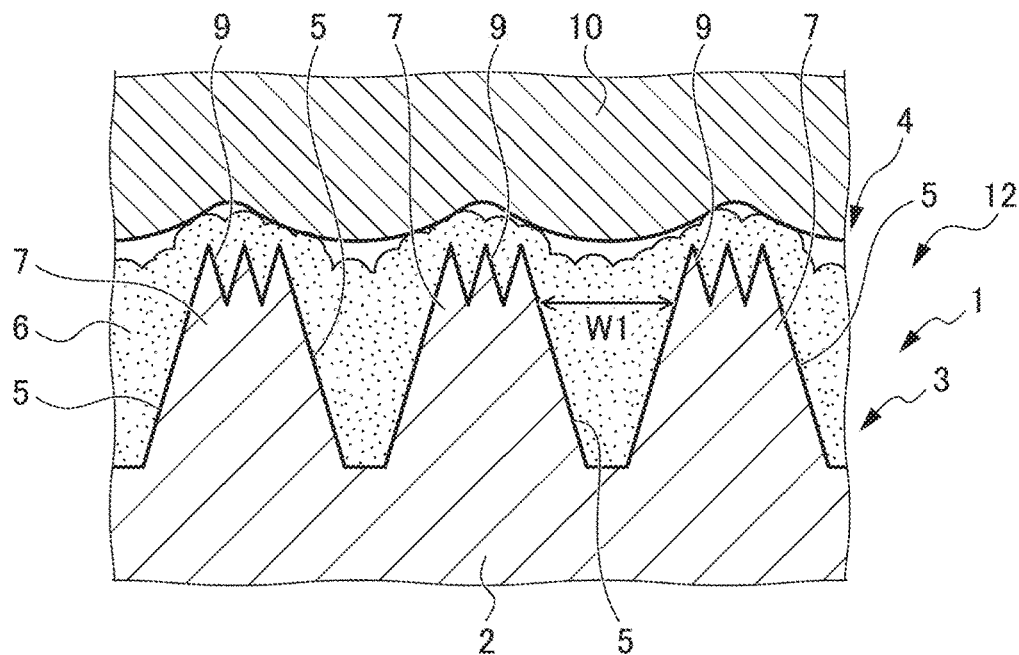
FIG. 2 is a schematic sectional view illustrating a surface processing part of the casting mold according to the embodiment of the present invention.

In the following, an example of an embodiment of the present invention will be described. FIG. 1 is a sectional view illustrating an injection process in an aluminum casting process using a casting mold according to the embodiment of the present invention. FIG. 2 is a schematic sectional view illustrating a surface processing part of the casting mold according to the embodiment of the present invention.

A casting mold 1 according to the embodiment is for casting aluminum 10 into a desired shape in cooperation with a male mold 8, as illustrated in FIG. 1. This casting mold 1 includes a mold material 2, and the mold material 2 includes a product part 11 and a plan part 12. As illustrated in FIG. 2, a surface processing part 3 is formed in the molten metal contact part of the plan part 12 (the part where casting mold 1 is in contact with the molten metal). In this surface processing part 3, a plurality of tapered groove parts 5 is coated with a carbon film 6. These groove parts 5 are formed in two orthogonal directions (the direction orthogonal to the plane of the sheet, and the horizontal direction in FIG. 2) with a predetermined width W1, in parallel with each other to form, as a whole, a grid groove 4 in the surface of the surface processing part 3, that is, the molten metal contact part. Here, the width W1 of the groove parts 5 means the width of the opening end parts of the groove parts 5. Also, a plurality of projection parts 7 is provided along with forming these groove parts 5. A plurality of microscopic grooves 9 is formed in the top surface of each of the projection parts 7. Also, the carbon film 6 is formed in such a manner as to cover all of the groove parts 5 and all of the microscopic grooves 9.

Also, as illustrated in FIG. 1, a gate 13 for pouring molten metal is formed in the casting mold 1. Moreover, a plunger 14 to push the molten metal poured from this gate 13 is attached to the casting mold 1 in such a manner so as to be movable in the directions of arrows M and N.

In the surface processing part 3 of the casting mold 1, groove parts 5 of a predetermined depth are formed by a process which is performed with a pulsed laser device (not illustrated) that emits a pulsed laser beam with a pulse width being 10 psec (picosecond) or narrower and in which this pulsed laser beam is emitted to the flat surface of the mold material 2 while scanning. More specifically, for example, a plurality of groove parts 5 is formed in a grid shape by first laser processing, and a plurality of microscopic grooves 9 is formed, by second laser processing, in the top surfaces of a plurality of projection parts 7 provided when forming these groove parts 5.

In a case where the aluminum 10 is cast into a desired shape with this casting mold 1, first, the molten aluminum 10 (molten metal) is poured from the gate 13 in a state in which the plunger 14 is retracted in the direction of the arrow N as indicated by the two-dot chain line in FIG. 1 and the casting mold 1 is clamped to the male mold 8 (pouring process). Then, the plunger 14 is pushed in the direction of the arrow M as indicated by the solid line in FIG. 1, and this aluminum 10 is supplied from the plan part 12 into the product part 11, that is, the inside of a cavity 15 (injection process). Then, when the aluminum 10 is spread into the whole area of the cavity 15, the casting mold 1 is cooled and the aluminum 10 is solidified (curing process). Subsequently, the casting mold 1 is retracted from the male mold 8 (mold opening process), and the aluminum 10 as a cast (product) is ejected (ejection process). This is the end of the casting of the aluminum 10.

In this injection process, when the aluminum 10 is supplied to the plan part 12 of the casting mold 1, penetration of the aluminum 10 into the grid groove 4 is generated since the grid groove 4 is formed in the surface processing part 3 of the plan part 12. When the penetration rate of this aluminum 10 becomes high, the contact area between the aluminum 10 and the coating (carbon film 6) is increased and frictional force is increased, whereby the coating becomes more likely to exfoliate from the groove parts 5.

Thus, in order to avoid such inconvenience, in the surface processing part 3 of the casting mold 1, the width W1 of the groove parts 5 is 35 μm or narrower, the skewness Ssk of the three-dimensional surface roughness is in the range of −0.8 to −0.2, and the indentation hardness H1 of the carbon film 6 tested by a nanoindenter is 1000 N/mm$^2$ or higher. Note that this skewness Ssk indicates the vertical distribution rate of the projection parts 7 with respect to the average depth of the grid groove 4 formed in the surface processing part 3. The top surfaces of the projection parts 7 become dull as this becomes lower, and the top surfaces of the projection parts 7 become sharp as this becomes higher.

As a result, the penetration rate of the aluminum 10 into the surface processing part 3 is controlled to be low, and this casting mold 1 can be optimized in such a manner that the coating (carbon film 6) is unlikely to exfoliate from the groove parts 5. Thus, it becomes possible to control exfoliation of the coating and to maintain the liquidity of the aluminum 10 in the casting mold 1.

A reason for this can be considered as follows. First, it is considered that the penetration rate of the aluminum 10 becomes high since the aluminum 10 becomes more likely to penetrate into the groove parts 5 when the width W1 of the groove parts 5 is too wide. Next, it is indicated that the top surfaces of the projection parts 7 become dull when the skewness Ssk of the three-dimensional surface roughness is too low. Since the volume of the groove parts 5 themselves is decreased, the coating becomes more likely to exfoliate. On the other hand, when this is too high, it can be inferred that the penetration rate of the aluminum 10 becomes high since the top surfaces of the projection parts 7 become sharp, the width of the groove parts 5 is increased, and the aluminum 10 becomes more likely to penetrate into the groove parts 5. Moreover, when the indentation hardness H1 of the carbon film 6 tested by a nanoindenter is too low, it is likely that the coating is not dense but porous. Thus, it is considered that the penetration rate of the aluminum 10 becomes high since the aluminum 10 is more likely to penetrate into the small holes in the coating, that is, the groove parts 5.

Figure 3:
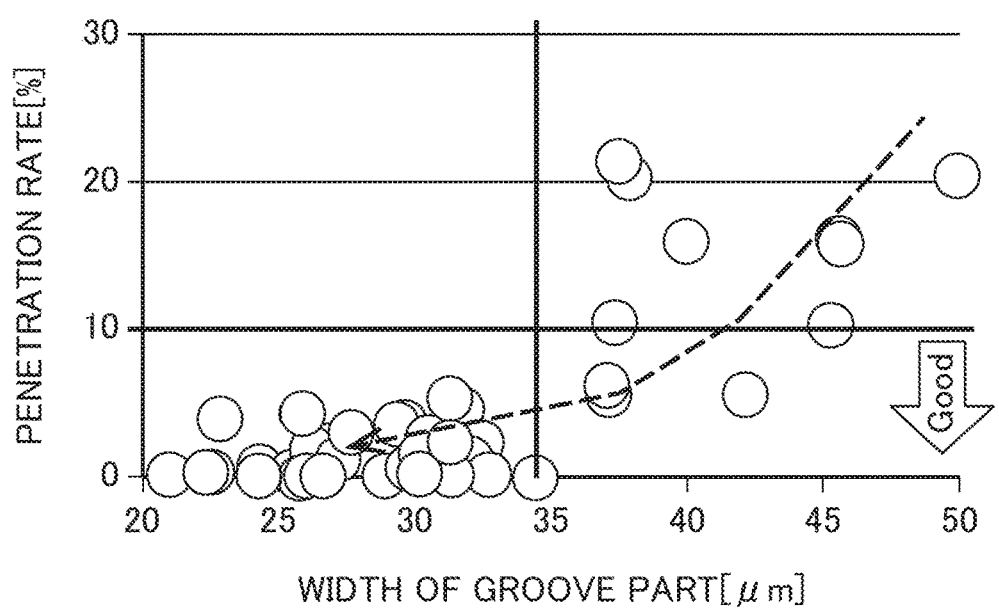
FIG. 3 is a graph illustrating the influence of the width of a groove part on the penetration rate of molten metal (aluminum).

In order to check this effect by an experiment, first, the influence of the width W1 of the groove parts 5 on the penetration rate of the aluminum 10 is checked with respect to this casting mold 1. More specifically, the width W1 of the groove parts 5 is changed in stages roughly between 21 and 50 μm, and the penetration rate of the aluminum 10 at that time is measured. The result is illustrated in FIG. 3. In the graph in FIG. 3, the horizontal axis indicates the width W1 of the groove parts 5 (unit: μm), and the vertical axis indicates the penetration rate of the aluminum 10 (unit: %).

As it is obvious from the graph in FIG. 3, there is a tendency that the penetration rate of the aluminum 10 increases with an increase in the width W1 of the groove parts 5. It is found that the penetration rate of the aluminum 10 is controlled to be low and to be 10% or lower when the width W1 of the groove parts 5 is 35 μm or narrower (W1≤35 μm).

Figure 4:
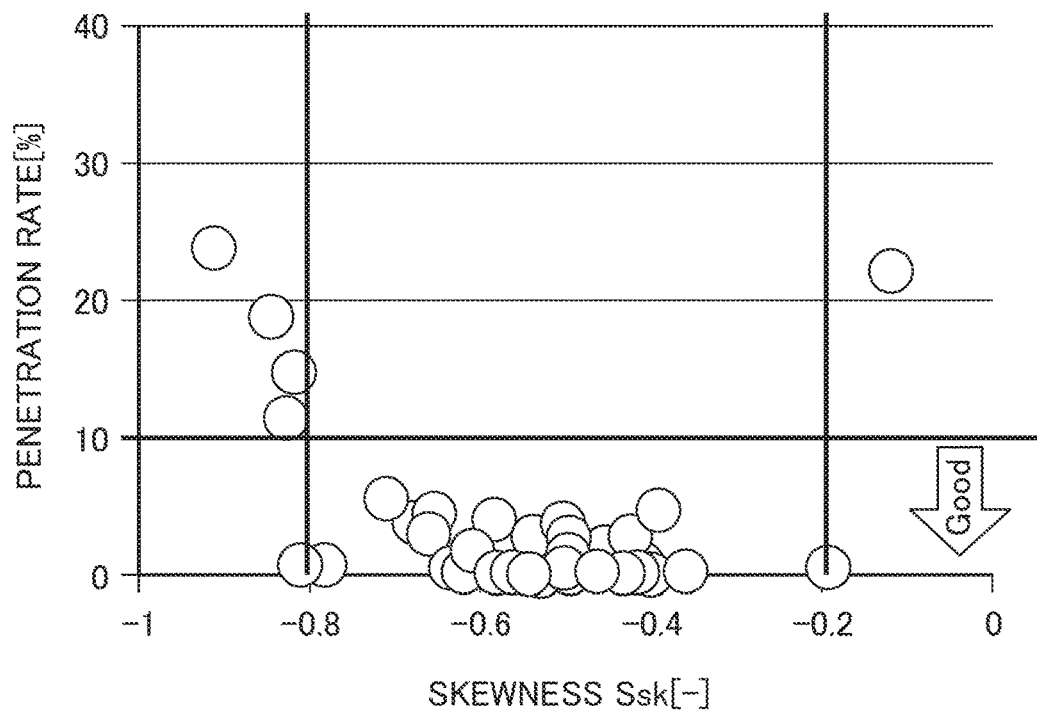
FIG. 4 is a graph illustrating the influence of the skewness of the three-dimensional surface roughness of the surface processing part on the penetration rate of the molten metal (aluminum).

Next, the influence of the skewness Ssk of the three-dimensional surface roughness on the penetration rate of the aluminum 10 is checked with respect to this casting mold 1. More specifically, this skewness Ssk is changed in stages roughly between −0.9 and −0.1 and the penetration rate of the aluminum 10 at that time is measured. The result is illustrated in FIG. 4. In a graph in FIG. 4, the horizontal axis indicates the skewness Ssk of the three-dimensional surface roughness of the surface processing part 3 (dimensionless quantity), and the vertical axis indicates the penetration rate of the aluminum 10 (unit: %). Note that this skewness Ssk is measured in compliance with ISO 25178 (JIS B 0601).

As it is obvious from the graph in FIG. 4, the penetration rate of the aluminum 10 increases when the skewness Ssk of the three-dimensional surface roughness of the surface processing part 3 is too low or too high. It is found that the penetration rate of the aluminum 10 is controlled to be low and to be 10% or lower when this skewness Ssk is in the range of −0.8 to −0.2 (−0.8≤Ssk≤−0.2).

However, even in the case where the above-described two conditions (W1≤35 μm, and −0.8≤Ssk≤−0.2) are satisfied, when the coating processing time is short, there may be a case where coating is not in a dense state (is porous) and the penetration rate of the aluminum 10 is not 10% or lower.

Thus, in order to check the relationship between coating processing time and the indentation hardness H1 of the carbon film 6 using a nanoindenter with respect to the casting mold 1 that satisfies both of the above-described two conditions (W1≤35 μm, and −0.8≤Ssk≤−0.2), the coating processing time is set to six levels (1.5 h, 2 h, 3 h, 4 h, 6 h, and 8 h), and the indentation hardness H1 of the carbon film 6 at each level is measured at ten places.

Figure 5:
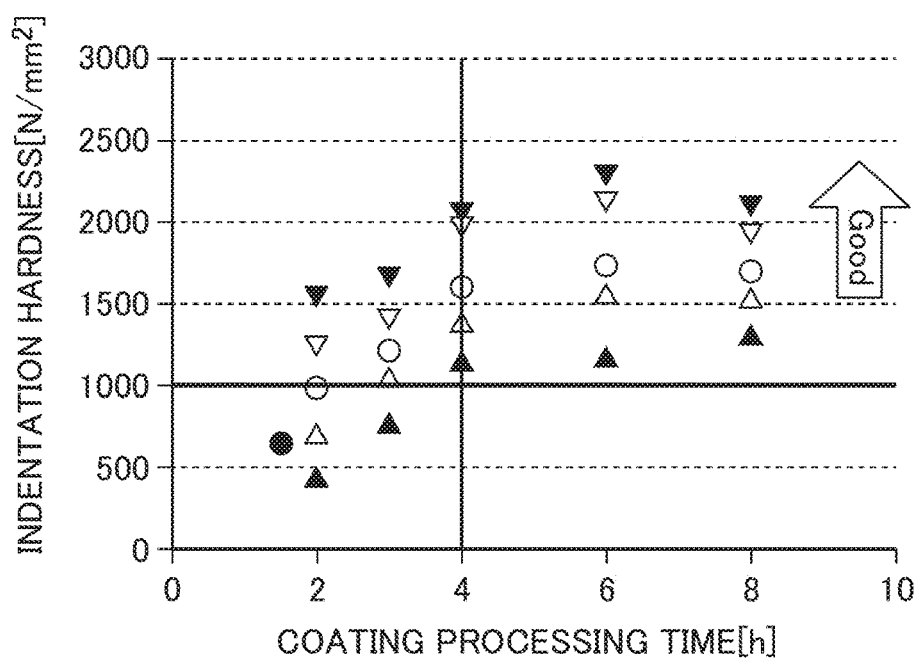
FIG. 5 is a graph illustrating the relationship between coating processing time and indentation hardness of a carbon film.

The result is illustrated in FIG. 5. In the graph in FIG. 5, the horizontal axis indicates the coating processing time (unit: h), and the vertical axis indicates the indentation hardness H1 of the carbon film 6 tested by a nanoindenter (unit: N/mm$^2$). In this graph, the average value is plotted with ○, the maximum value is plotted with ▽, the minimum value is plotted with Δ, the numeric value three times larger than the standard deviation is plotted with ▼ (upper side) and ▲ (lower side) at each level of the coating processing time (horizontal axis). Note that the same values are acquired as the indentation hardness H1 at the ten places when the coating processing time is 1.5 h.

Then, in order to check the relationship between coating processing time and the penetration rate of the aluminum 10 (molten metal) with respect to the casting mold 1 that satisfies both of the above-described two conditions (W1≤35 μm, and −0.8≤Ssk≤−0.2), the coating processing time is set to five levels (2 h, 3 h, 4 h, 6 h, and 8 h), and the penetration rate of the aluminum 10 at each level is measured at eight places.

Figure 6:
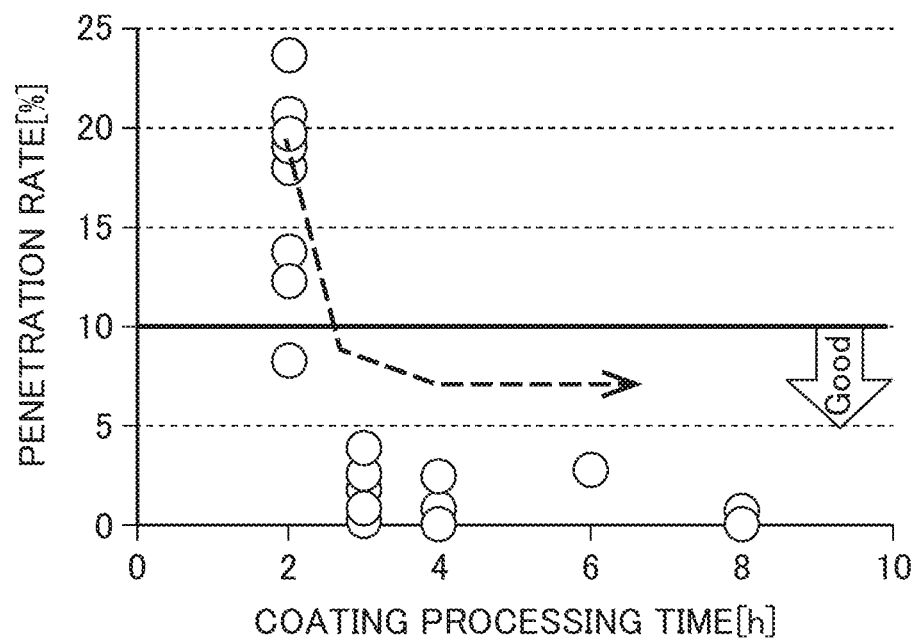
FIG. 6 is a graph illustrating the relationship between coating processing time and the penetration rate of the molten metal (aluminum).

The result is illustrated in FIG. 6. In the graph in FIG. 6, the horizontal axis indicates the coating processing time (unit: h), and the vertical axis indicates the penetration rate of the aluminum 10 (unit: %). In this graph, eight pieces of data are plotted as they are at each level of the coating processing time (horizontal axis).

When the relationship between the indentation hardness H1 of the carbon film 6 and the penetration rate of the aluminum 10 is digested through the coating processing time on the basis of the relationship between the coating processing time and the indentation hardness H1 of the carbon film 6 (FIG. 5) and the relationship between the coating processing time and the penetration rate of the aluminum 10 (FIG. 6), it is possible to conclude that the penetration rate of the aluminum 10 can be controlled to be low and to be 10% or lower in the case where the indentation hardness H1 of the carbon film 6 is 1000 N/mm$^2$ or higher (H1≥1000 N/mm$^2$).

In such a manner, according to the present embodiment, it is possible to optimize the surface processing part 3 of the casting mold 1 in such a manner that the coating (carbon film 6) is unlikely to exfoliate from the groove parts 5 by specifying the numeric value of the surface texture thereof with three evaluation indexes (width W1 of groove part 5, skewness Ssk, and indentation hardness H1 of carbon film 6) and controlling the penetration rate of the aluminum 10 to be low (10% or lower). As a result, it becomes possible to control exfoliation of the coating and to maintain liquidity of the aluminum 10 in the casting mold 1.

Also, as described above, in the surface processing part 3 of this casting mold 1, the microscopic grooves 9 are formed in the top surfaces of the projection parts 7, and coating with the carbon film 6 is performed at a thickness to at least cover the microscopic grooves 9. Thus, the microscopic grooves 9 are engaged with the carbon film 6 and the carbon film 6 becomes more unlikely to exfoliate. Also, even when the carbon film 6 partially exfoliates, the contact state of the aluminum 10 and the surface processing part 3 is a point contact. Thus, it is possible to maintain the heat insulation property of the two and to maintain improved liquidity of the aluminum 10.

Moreover, as described above, since the surface processing part 3 of this casting mold 1 is formed in the molten metal contact part of the plan part 12, it becomes possible to reduce the material of the plan part 12 and to correspond to turning into a thin runner.

In the above, an embodiment of the present invention has been described. However, the present invention is not limited to the above-described embodiment. Also, the effect described in the present embodiment is just the most preferred effect generated from the present invention and the effect of the present invention is not limited to what has been described in the present embodiment.

For example, in the above-described embodiment, a case where a pulsed laser device that emits a pulsed laser beam with a pulse width being 10 psec or narrower is used in the forming of the surface processing part 3 has been described. However, it is not necessary to use a pulsed laser device having such performance.

Also, in the above-described embodiment, a case where the microscopic grooves 9 are formed in the top surfaces of the projection parts 7 has been described. However, the embodiment of the present invention can be also applied to a case where no microscopic groove 9 is formed in the top surface.

Also, in the above-described embodiment, the casting mold 1 in which the surface processing part 3 having a predetermined surface texture is formed in the plan part 12 has been described. However, it is possible to acquire a similar effect by forming this surface processing part 3 in the product part 11 of the casting mold 1.

Moreover, in the above-described embodiment, the casting mold 1 to cast the aluminum 10 has been described. However, the embodiment of the present invention can be also applied to a casting mold to cast metal other than the aluminum 10.

Explanation of Reference Numerals 1 casting mold
2 mold material
3 surface processing part
4 grid groove
5 groove part
6 carbon film
7 projection part
9 microscopic groove
10 aluminum (molten metal)
11 product part
12 plan part H1 indentation hardness of carbon film
W1 width of groove part

What is claimed is:

1. An aluminum casting mold comprising:
   a surface processing part in which a groove part of a grid groove formed in a surface of a molten metal contact part of a mold material is coated with a carbon film,
   wherein in the surface processing part, a width of opening end parts of the groove part is 35 μm or narrower, skewness of three-dimensional surface roughness is in a range of −0.8 to −0.2, and indentation hardness of the carbon film tested by a nanoindenter is 1000 NI/mm² or higher, the skewness of three-dimensional surface roughness being a vertical distribution rate of projection parts defining the groove part with respect to an average depth of the grid groove.

2. The aluminum casting mold according to claim 1, wherein the aluminum casting mold includes a product part and a plan part, and the surface processing part is formed in the molten metal contact part of the mold material of the plan part.

3. A method of producing the aluminum casting mold according to claim 2, comprising:
   forming the groove part by emitting a pulsed laser beam onto a surface of the mold material with a pulsed laser device that emits the pulsed laser beam with a pulse width of 10 psec or narrower.

4. The method of producing the aluminum casting mold according to claim 3, wherein the groove part is formed by first laser processing in such a manner that a width thereof becomes 35 μm or narrower,
   a microscopic groove is formed, by second laser processing, in a top surface of the projection parts provided when forming the groove part, and
   the carbon film is formed in such a manner as to cover the groove part and the microscopic groove.

5. A method of producing the aluminum casting mold according to claim 1, comprising:
   forming the groove part by emitting a pulsed laser beam onto a surface of the mold material with a pulsed laser device that emits the pulsed laser beam with a pulse width of 10 psec or narrower.

6. The method of producing the aluminum casting mold according to claim 5, wherein the groove part is formed by first laser processing in such a manner that a width thereof becomes 35 μm or narrower,
   a microscopic groove is formed, by second laser processing, in a top surface of the projection parts provided when forming the groove part, and
   the carbon film is formed in such a manner as to cover the groove part and the microscopic groove.

* * * * *